(12) United States Patent
Huang (10) Patent No.: US 12,077,951 B2
(45) Date of Patent: Sep. 3, 2024

(54) FLEXIBLE SUPPORTING STRUCTURE (71) Applicant: Beijing Kohler Ltd., Beijing (CN)

(72) Inventor: Jiagao Huang, Beijing (CN)

(73) Assignee: BEIJING KOHLER LTD., Beijing (CN)

(*) Notice: Subject to any disclaimer, the term of this patent is extended or adjusted under 35 U.S.C. 154(b) by 304 days.

(21) Appl. No.: 17/580,837

(22) Filed: Jan. 21, 2022

(65) Prior Publication Data
US 2022/0243434 A1 Aug. 4, 2022

(30) Foreign Application Priority Data

Jan. 29, 2021 (CN) .......................... 202120267665.4

(51) Int. Cl.
*E03C 1/04* (2006.01)
*F16D 3/18* (2006.01)

(52) U.S. Cl.
CPC .............. *E03C 1/0404* (2013.01); *F16D 3/18* (2013.01); *E03C 2001/0414* (2013.01); *E03C 2001/0417* (2013.01)

(58) Field of Classification Search
CPC .. F16D 3/18; E03C 1/0404; E03C 2001/0414; E03C 2001/0417; F16L 11/18; B25J 9/065; B25J 9/06; B25J 18/06
See application file for complete search history.

(56) References Cited

U.S. PATENT DOCUMENTS

| 4,435,120 | A | * | 3/1984 | Ikeda | B25J 9/06 414/735 |
| 5,045,034 | A | * | 9/1991 | Almeda, Jr. | B25J 9/103 475/5 |
| 5,456,568 | A | * | 10/1995 | Kirby | E02F 3/427 414/722 |
| 7,047,835 | B2 | * | 5/2006 | Yamagishi | B25J 9/08 446/353 |
| 11,058,925 | B1 | * | 7/2021 | Lebovici | A63B 47/02 |

FOREIGN PATENT DOCUMENTS

CN 109533051 A * 3/2019 ............. B62D 55/04

* cited by examiner

*Primary Examiner* — Jake Cook
(74) *Attorney, Agent, or Firm* — FOLEY & LARDNER LLP (57) ABSTRACT The present disclosure is directed to a flexible supporting structure that includes a linkage mechanism capable of being bent for adjustment. The linkage mechanism includes at least one row of a linkage plate assembly, and the linkage plate assembly includes at least two linkage toothed plates which are meshed and connected in sequence. At least one end portion of each of the at least two linkage toothed plates is provided with a meshing tooth portion such that a first meshing tooth portion of a first linkage toothed plate is meshed with a second meshing tooth portion of a second linkage toothed plate. The flexible supporting structure is applicable to various products and provides a function of adjusting an angle or a bending degree in a wide range by using linkage between the linkage toothed plates.

10 Claims, 8 Drawing Sheets

FLEXIBLE SUPPORTING STRUCTURE

CROSS-REFERENCE TO RELATED PATENT APPLICATIONS

This application claims the benefit and priority to Chinese Patent Application No. 202120267665.4, filed Jan. 29, 2021, the entire disclosure of which is hereby incorporated by reference herein.

TECHNICAL FIELD

The present application relates to the field of sanitary product technologies, and more particularly, to a flexible supporting structure.

BACKGROUND

In the sanitary industry, with the continuous improvement of people's aesthetic level, people have higher requirements for innovative design of sanitary products. Angles of common sanitary products (such as a faucet and a pendant) should also be adjustable. A water outlet angle of the faucet is generally adjusted through a bubbler or a pulling hose. Generally, the pendant is rotated integrally by rotating a pivot shaft.

In view of this, it is necessary to provide a flexible supporting structure capable of being applicable to the sanitary products and facilitating angle adjustment.

SUMMARY

The present disclosure relates to a flexible supporting structure capable of being bent for adjustment by its own structure, so as to facilitate angle adjustment of sanitary products.

At least one aspect of the present disclosure relates to a flexible supporting structure, which includes a linkage mechanism capable of being bent for adjustment, wherein, the linkage mechanism includes at least one row of linkage plate assembly, and the linkage plate assembly includes at least two linkage toothed plates which are meshed and connected in sequence; an end portion of the linkage toothed plate is provided with a meshing tooth portion; and the meshing tooth portions of two front-back-adjacent linkage toothed plates are meshed.

In some exemplary embodiments, the linkage mechanism includes two rows of linkage plate assemblies arranged left and right; two left-right-adjacent linkage toothed plates in the two rows of linkage plate assemblies are staggered front and back; and two left-right-adjacent linkage toothed plates in the two rows of linkage plate assemblies are connected through a pivot shaft, and are capable of being rotated synchronously with the pivot shaft.

In some exemplary embodiments, the pivot shaft is provided with a waist-shaped transmission portion; the linkage toothed plate is provided with a waist-shaped hole; and the waist-shaped transmission portion is at least partially located in the waist-shaped hole.

In some exemplary embodiments, the pivot shaft is provided with a spline transmission portion; the linkage toothed plate is provided with a spline hole; and the spline transmission portion is at least partially located in the spline hole.

In some exemplary embodiments, the pivot shaft is locked with the linkage toothed plate through a lock nut.

In some exemplary embodiments, at least one elastic member is sleeved on the pivot shaft, and the elastic member is located between the lock nut and the linkage toothed plate.

In some exemplary embodiments, a plurality of elastic members are sleeved on the pivot shaft.

In some exemplary embodiments, the linkage toothed plates at two ends of the linkage plate assembly are provided with supporting end blocks.

In some exemplary embodiments, the supporting end block is integrally formed with the linkage toothed plate.

In some exemplary embodiments, a central angle of the meshing tooth portion is at an angle ranging from 90 to 270 degrees.

DETAILED DESCRIPTION

The specific implementations of the present application are further described with reference to the accompanying figures, wherein like reference numerals refer to like elements. It is to be noted that the terms "front", "back", "left", "right", "up", and "down" used in the following description refer to the directions in the accompanying figures, and the terms "inner" and "outer" refer to the directions toward or far away from geometric centers of a specific parts respectively.

Generally speaking, a flexible supporting structure disclosed herein implements a function of adjusting an angle or a bending degree in a wide range by using a principle of linkage between the linkage toothed plates. The flexible supporting structure may be applicable to a faucet and/or a shower to facilitate adjustment of a water outlet angle. The flexible supporting structure may also be applicable to a rod of a pendant to facilitate adjustment of a bending degree of the rod.

FIGS. 1-5 illustrate a flexible supporting structure 100, according to an exemplary embodiment. As shown in FIGS. 1-5, the flexible supporting structure 100 includes a linkage mechanism capable of being bent for adjustment.

The linkage mechanism includes at least one row of a linkage plate assembly 1, and the linkage plate assembly 1 includes at least two linkage toothed plates 11 which are meshed and connected in sequence.

An end portion of at least one of the linkage toothed plates 11 is provided with a meshing tooth portion 111. The meshing tooth portions 111 of two front-back adjacent linkage toothed plates 11 (e.g., in each row) are meshed.

The flexible supporting structure 100 may be used in sanitary products, such as a faucet, a shower, and/or a pendant, so that angles of the faucet, the shower, or the like may be freely adjusted, and a rod of the pendant may be freely bent.

The linkage mechanism of the flexible supporting structure 100 may be bent for adjustment. The linkage mechanism includes at least one row of linkage plate assembly 1. The linkage plate assembly 1 includes at least two linkage toothed plates 11. One end of the linkage toothed plate 11 at the end portion of the linkage plate assembly 1 is provided with the meshing tooth portion 111, and two ends of the linkage toothed plate 11 in the middle of the linkage plate assembly 1 are both provided with the meshing tooth portions 111. An outline of the meshing tooth portion 111 is an arc with a plurality of teeth. During assembly, the meshing tooth portions 111 of the two front-back adjacent linkage toothed plates 11 are meshed, so that the two front-back adjacent linkage toothed plates 11 may be rotated and/or adjusted, and the two linkage toothed plates 11 cannot be separated due to a meshing force between teeth.

Figure 7:
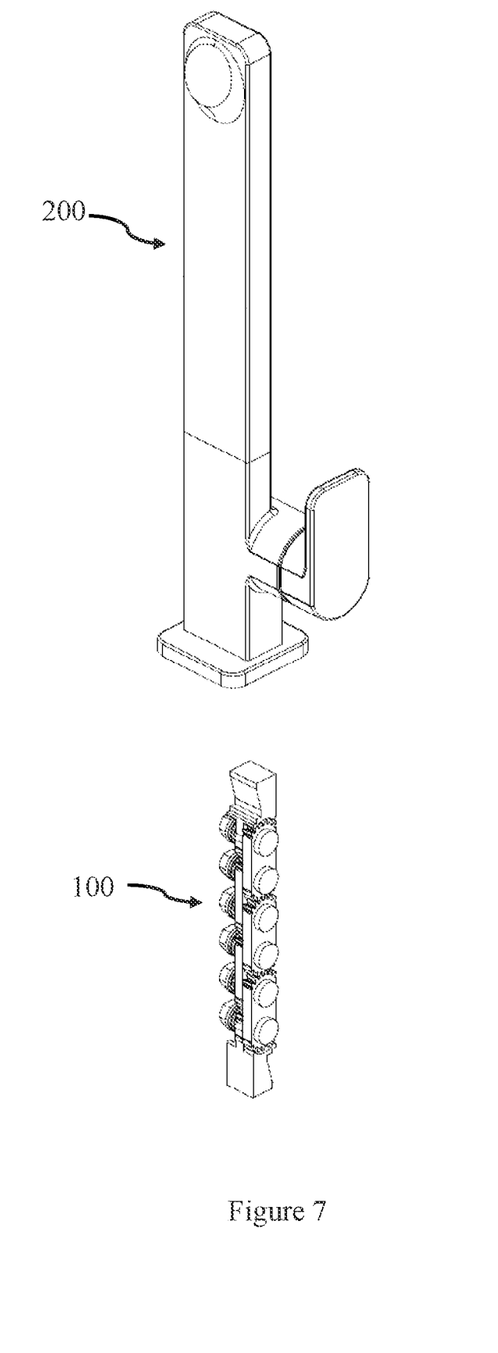
FIG. 7 is an exploded view of a faucet with a flexible supporting structure in a straight state.
Figure 8:
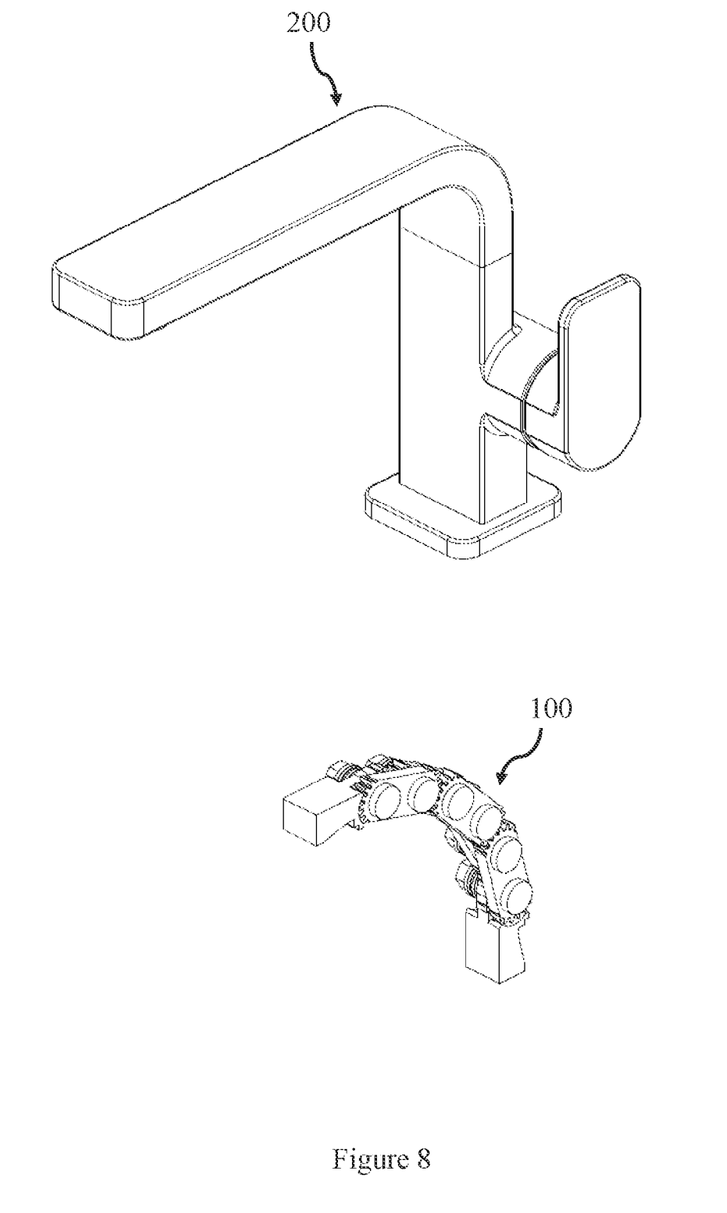
FIG. 8 is an exploded view of a faucet with a flexible supporting structure in a bending state.

FIGS. 7-8 illustrate a faucet, according to an exemplary embodiment. As shown in FIGS. 7-8, the faucet includes a housing 200 to house the flexible supporting structure 100. In some embodiments, the housing 200 may be a flexible housing. In some embodiments, the flexible housing may be a housing in a form of a corrugated tube. The housing 200 may also be provided with a flexible bending portion, such as silicone. The flexible supporting structure 100 is mounted within the housing 200. When the angle of the faucet needs to be adjusted, the flexible housing or the flexible bending portion on the housing 200 may be forcibly bent, so that the flexible supporting structure 100 is bent adaptively. When the faucet needs to recover to an initial straight state, the faucet may be automatically reset by forcibly pressing a bending convex portion.

If the flexible supporting structure 100 is mounted on the pendant, the flexible housing or the flexible bending portion described above may also be used as the rod of the pendant, and a configuration mode similar to that of the faucet is used.

Thus, the flexible supporting structure 100 implements a function of adjusting an angle or a bending degree in a wide range by using a principle of linkage between the linkage toothed plates 11, and can be applicable to various products, thus having a wide application range.

In some embodiments, the linkage mechanism includes two rows of linkage plate assemblies 1 arranged left and right as shown in FIGS. 1-5. Two left-right adjacent linkage toothed plates 11 in the two rows of linkage plate assemblies 1 are staggered front and back, such that an end portion (e.g., the meshing tooth portion 111) of at least a one linkage tooth plate 11 in one row is spaced apart from an end portion of at least one linkage tooth plate 11 in the other row. Two left-right adjacent linkage toothed plates 11 in the two rows of linkage plate assemblies 1 are connected through a pivot shaft 2, and are capable of being rotated synchronously with the pivot shaft 2.

In some embodiments, the linkage mechanism includes the two rows of linkage plate assemblies 1. For example, the two rows of linkage plate assemblies 1 are arranged left and right, and two left-right adjacent linkage toothed plates 11 in the two rows of linkage plate assemblies 1 are staggered front and back. That is, the end portion of the left linkage toothed plate 11 is not aligned with that of the right linkage toothed plate 11, and meshing positions on left and right sides are misaligned and staggered front and back.

Every two left-right adjacent linkage toothed plates 11 are connected through one pivot shaft 2, and the two linkage toothed plates 11 are both capable of being rotated synchronously with the pivot shaft 2.

Assuming that one row of linkage plate assembly 1 on the left comprises N linkage toothed plates 11, then one row of linkage plate assembly 1 on the right comprises N+1 linkage toothed plates 11, where N is a natural number greater than or equal to 2.

One end of each linkage toothed plate 11 in one row of the linkage plate assembly 1 (e.g., on the left) is connected with one linkage toothed plate 11 in one row of the linkage plate assembly 1 (e.g., on the right) through one pivot shaft 2. The other end is connected with another linkage toothed plate 11 in one row of the linkage plate assembly 1 (e.g., on the right) through another pivot shaft 2.

In this way, two left-right adjacent linkage toothed plates 11 may be firmly connected, and may be transmitted through the pivot shaft 2. Meanwhile, two front-back adjacent linkage toothed plates 11 in each row of linkage plate assembly 1 cannot be separated, thus improving structural stability.

In some embodiments, a transmission mode is as follows: firstly, the linkage toothed plate 11 at a rear end portion in one row of linkage plate assembly 1 on the right rotates under a force, then the linkage toothed plate 11 at the rear end portion may drive the pivot shaft 2 connected with it to rotate, and the pivot shaft 2 may drive the left linkage toothed plate 11 connected with the pivot shaft to rotate synchronously. The left linkage toothed plate 11 may drive the pivot shaft 2 at a front end of the left linkage toothed plate to rotate, then the pivot shaft 2 drives the right linkage toothed plate 11 to rotate, and so on, driving from rear to front, so that the linkage mechanism may be adjusted in a wide range. If it needs a large bending degree of the flexible supporting structure 100, a rotating angle of the linkage toothed plate 11 at the end portion is increased. If it needs a small bending degree of the flexible supporting structure 100, the rotating angle of the linkage toothed plate 11 at the end portion is decreased.

The flexible supporting structure 100 may be directly used as a part of the rod of the pendant.

Figure 3:
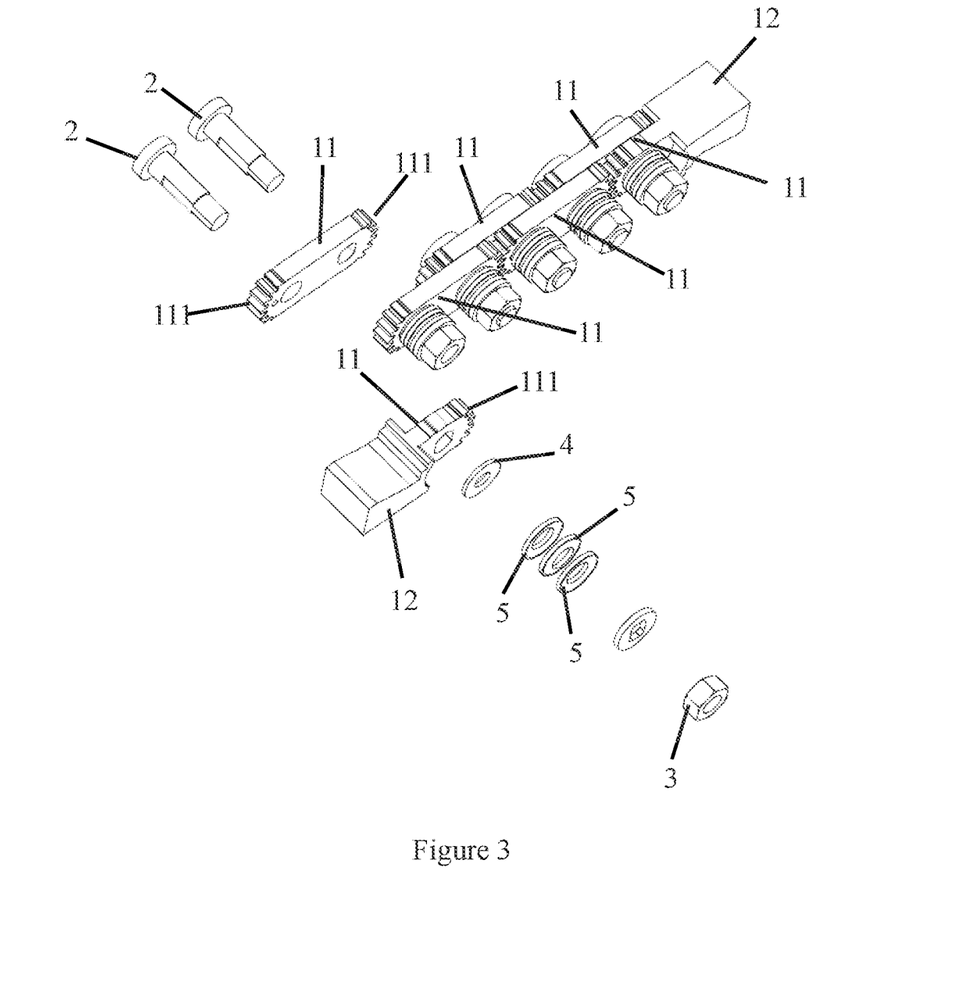
FIG. 3 is a partial exploded view of a flexible supporting structure provided by an embodiment of the present application.
Figure 4:
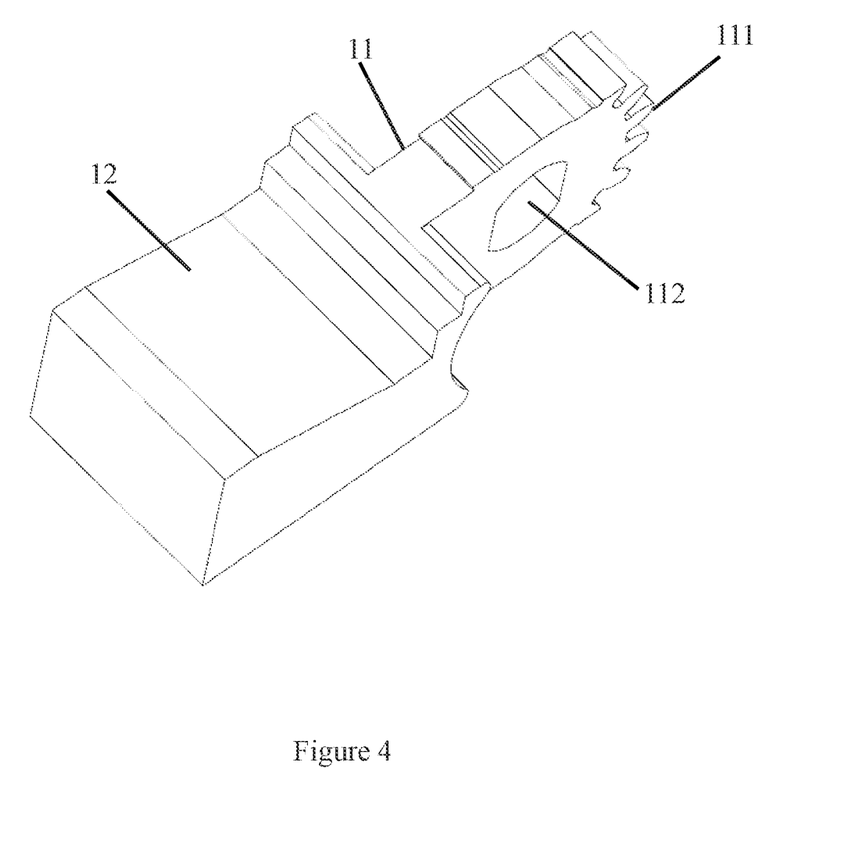
FIG. 4 is a schematic view of a linkage toothed plate, at an end portion of a linkage plate assembly, provided with a supporting end block.
Figure 5:
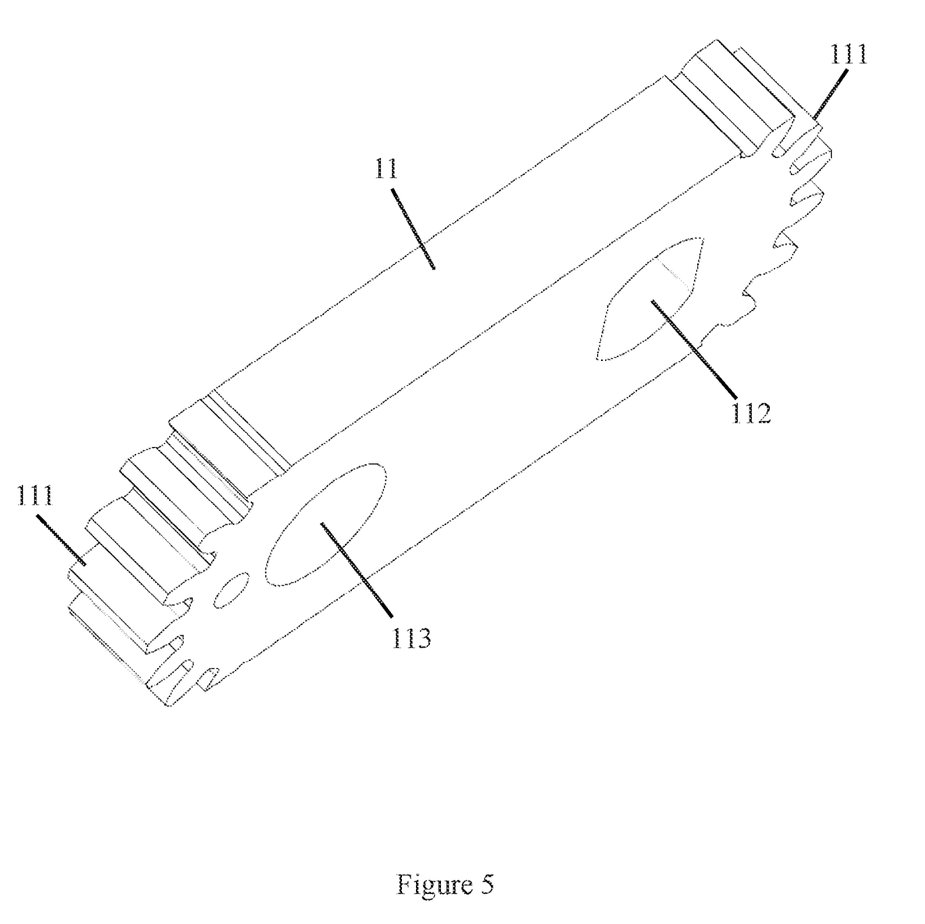
FIG. 5 is a perspective view of the linkage toothed plate in the middle of the linkage plate assembly.
Figure 6:
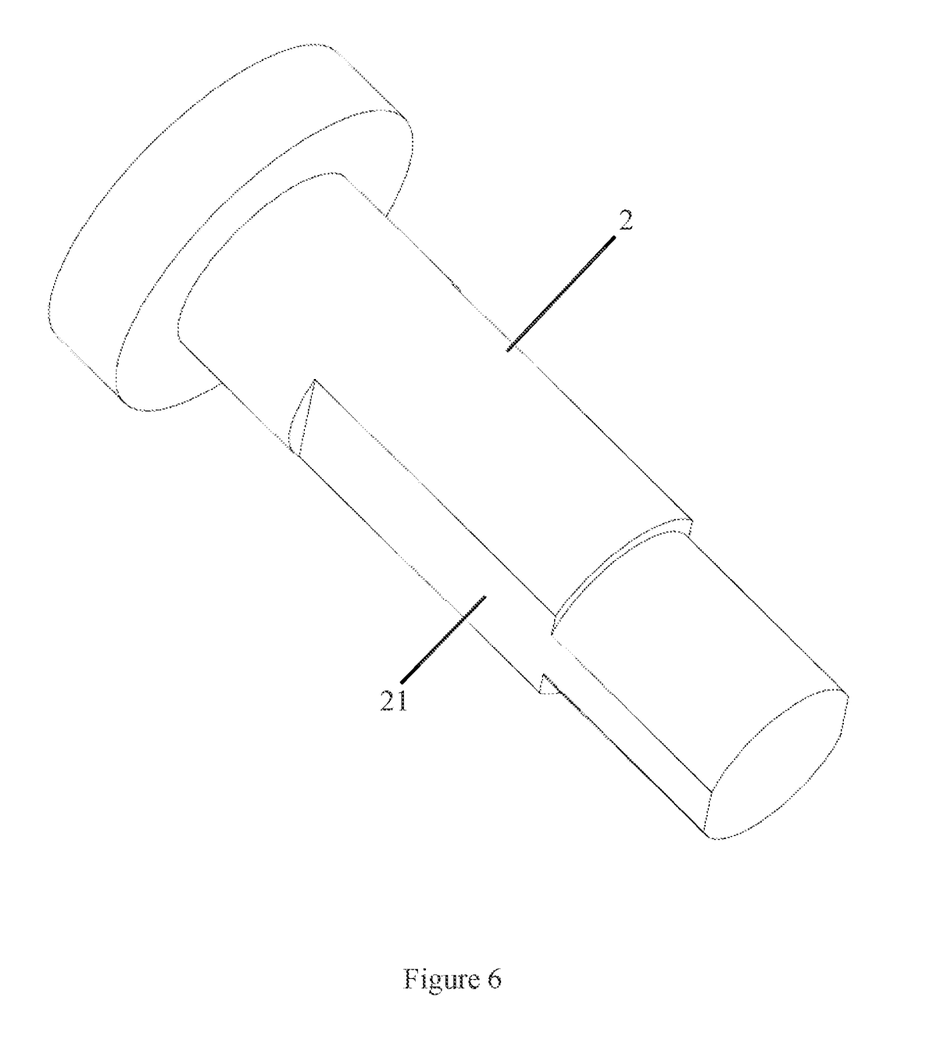
FIG. 6 is a perspective view of a pivot shaft.

In some embodiments, as shown in FIG. 3 and FIG. 5, the pivot shaft 2 is provided with a waist-shaped transmission portion 21. The linkage toothed plate 11 is provided with a waist-shaped hole 112. The waist-shaped transmission portion 21 is at least partially located in the waist-shaped hole.

In some embodiments, the waist-shaped transmission portion 21 or a special-shaped transmission portion or a non-circular transmission portion is formed by cutting a side surface of the pivot shaft 2, so that a torque may be transmitted. In order to transmit the torque, the linkage toothed plate 11 is provided with the waist-shaped hole 112. Each pivot shaft 2 passes through the waist-shaped hole 112 in the linkage toothed plate 11, so that the linkage toothed plate 11 can be rotated integrally with the pivot shaft 2.

As needed, if the pivot shaft 2 is locked through a locking member, one end of the linkage toothed plate 11 in the middle may also be provided with the waist-shaped hole 112, and the other end is provided with a round hole 113. The waist-shaped hole 112 and the round hole 113 in two left-right adjacent linkage toothed plates 11 are arranged in a pair, that is, the pivot shaft 2 may also transmit the torque by passing through the round hole 113 in one linkage toothed plate 11 and the waist-shaped hole 112 in the other linkage toothed plate 11.

In some embodiments, the pivot shaft 2 is provided with a spline transmission portion. The linkage toothed plate 11 is provided with a spline hole. The spline transmission portion is at least partially located in the spline hole. In some embodiments, spline transmission is used, which is convenient for mounting.

Figure 1:
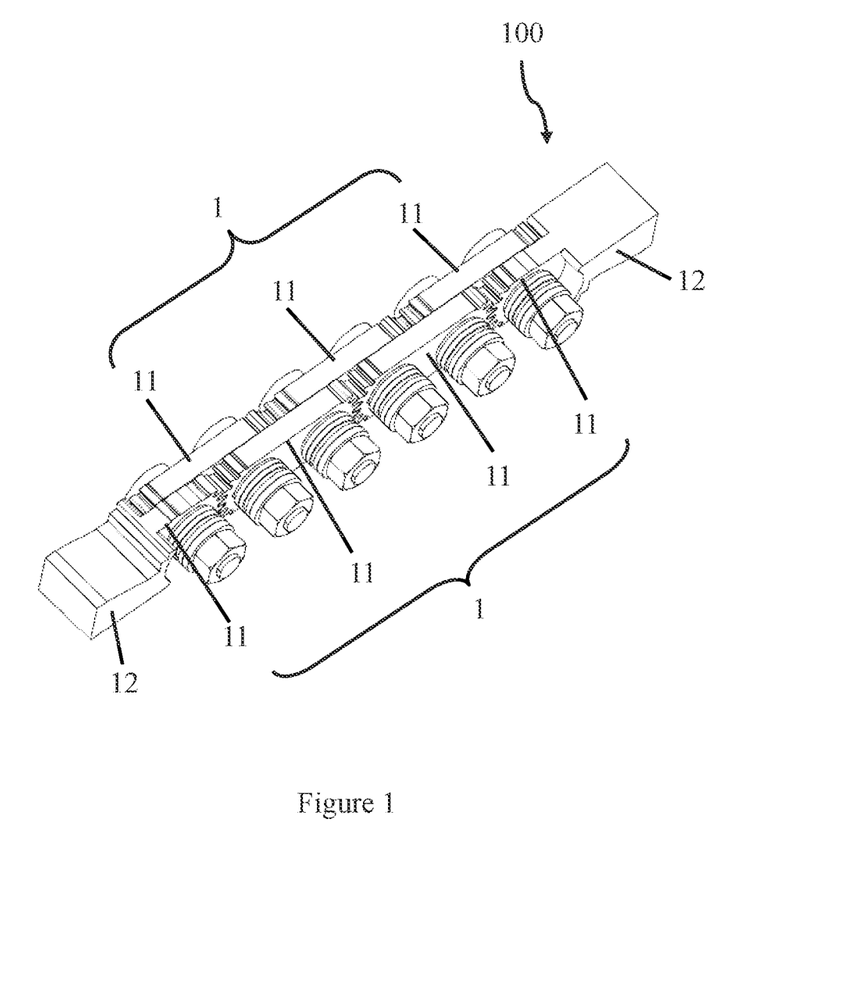
FIG. 1 is a schematic view of a flexible supporting structure provided by an embodiment of the present application in a straight state.
Figure 2:
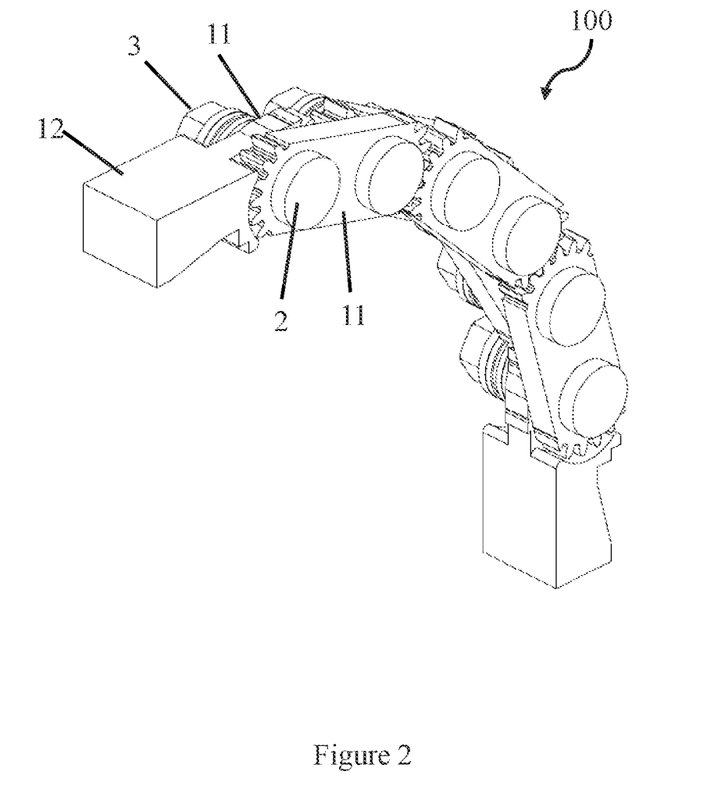
FIG. 2 is a schematic view of a flexible supporting structure provided by an embodiment of the present application in a bending state.

In some embodiments, as shown in FIGS. 1-3, the pivot shaft 2 is locked with the linkage toothed plate 11 through a lock nut 3, and a locking force between two left and right linkage toothed plates 11 may be adjusted by adjusting a tightness of the lock nut 3. A gasket 4 is arranged on one side of the linkage toothed plate 11 to avoid the lock nut 3 from directly contacting with the linkage toothed plate 11, thus playing a protective role.

In some embodiments, as shown in FIGS. 1-3, at least one elastic member 5 is sleeved on the pivot shaft 2, and the elastic member 5 is located between the lock nut 3 and the linkage toothed plate 11.

The elastic member 5 may be a spring or an elastic gasket for adjusting the locking force of the lock nut 3.

In some embodiments, as shown in FIG. 3, a plurality of elastic members 5 are sleeved on the pivot shaft 2, so that the locking force of the lock nut 3 may be adjusted in a larger range.

In some embodiments, as shown in FIGS. 1-3, the linkage toothed plates 11 at two ends of the linkage plate assembly 1 are provided with supporting end blocks 12.

During mounting, the supporting end block 12 is a stressed end or a mounting end. The linkage toothed plate 11 at the end portion may be driven to rotate by operating the supporting end block 12, which is convenient for mounting and operation.

In some embodiments, the supporting end block 12 is integrally formed with the linkage toothed plate 11, thus having a high structural strength.

In some embodiments, a central angle ($\alpha$) of the meshing tooth portion 111 is an angle anywhere in the range of 90 degrees to 270 degrees ($90°\leq\alpha\leq270°$). An outline of the meshing tooth portion 111 is an arc, and a plurality of teeth are evenly distributed on an outer surface of the outline of the meshing tooth portion 111. The central angle ($\alpha$) of the outline of the meshing tooth portion 111 is between 90° and 270°, which increases an adjustment range of the two front-back adjacent linkage toothed plates 11, and is beneficial for expanding a bending adjustment capability of the flexible supporting structure 100.

The flexible supporting structure of the present disclosure implements a function of adjusting an angle or a bending degree in a wide range by using a principle of linkage between the linkage toothed plates, and can be applicable to various products, and has a wide application range.

According to needs, the above technical solutions may be combined to achieve the best technical effect.

The above description is only the principles and the preferred embodiments of the present application. It is to be pointed out that for those of ordinary skills in the art, several other modifications may be made on the basis of the principle of the present application, which should also be regarded as falling in the scope of protection of the present application.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the support structure as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments.

Other substitutions, modifications, changes and omissions may also be made in the design, operating conditions and arrangement of the various exemplary embodiments without departing from the scope of the present invention. For example, any element disclosed in one embodiment may be incorporated or utilized with any other embodiment disclosed herein.

What is claimed is:

1. A flexible supporting structure, comprising:
    a linkage mechanism configured to be bent for adjustment, the linkage mechanism having two rows of linkage plate assemblies positioned adjacent to each other and each comprising linkage toothed plates;
    wherein a first row of the two rows includes at least two linkage toothed plates that are meshed and connected in sequence;
    wherein at least one end portion of each of the at least two linkage toothed plates is provided with a meshing tooth portion such that a first meshing portion of a first linkage toothed plate meshes with a second meshing portion of a second linkage toothed plate, the first meshing portion opposing the second meshing portion;

wherein the linkage mechanism is configured such that an end of a linkage toothed plate of the first row of the two rows is spaced apart from an end of a linkage toothed plate of a second row of the two rows;

wherein a pivot shaft connects two adjacent linkage toothed plates of the two rows and is configured such that the linkage toothed plates are capable of being rotated synchronously with the pivot shaft;

wherein the pivot shaft is locked with the two adjacent linkage toothed plates through a lock nut; and wherein an elastic member is sleeved on the pivot shaft, and the elastic member is located between the lock nut and one of the two adjacent linkage toothed plates.

2. The flexible supporting structure according to claim 1, wherein:
the pivot shaft is provided with a transmission portion;
at least one of the two adjacent linkage toothed plates is provided with a cylindrically shaped hole; and
the transmission portion is at least partially located in the cylindrically shaped hole.

3. The flexible supporting structure according to claim 1, wherein:
the pivot shaft is provided with a spline transmission portion;
at least one of the two adjacent linkage toothed plates is provided with a spline hole; and
the spline transmission portion is at least partially located in the spline hole.

4. The flexible supporting structure according to claim 1, wherein a plurality of elastic members are sleeved on the pivot shaft.

5. The flexible supporting structure according to claim 1, wherein the linkage toothed plates at each end of the two rows of linkage plate assemblies are provided with supporting end blocks.

6. The flexible supporting structure according to claim 5, wherein the supporting end block is integrally formed with the corresponding linkage toothed plate.

7. The flexible supporting structure according to claim 1, wherein the two rows of linkage plate assemblies include a different amount of linkage toothed plates.

8. A faucet, comprising:
a housing; and
a linkage mechanism configured to be bent for adjustment, the linkage mechanism having two rows of linkage plate assemblies positioned adjacent to each other and each comprising linkage toothed plates;
wherein a first row of the two rows includes at least two linkage toothed plates that are meshed and connected in sequence;
wherein at least one end portion of each of the at least two linkage toothed plates is provided with a meshing tooth portion such that a first meshing portion of a first linkage toothed plate meshes with a second meshing portion of a second linkage toothed plate, the first meshing portion opposing the second meshing portion;
wherein the linkage mechanism is configured such that an end of a linkage toothed plate of the first row of the two rows is spaced apart from an end of a linkage toothed plate of a second row of the two rows;
wherein a pivot shaft connects two adjacent linkage toothed plates of the two rows and is configured such that the linkage toothed plates are capable of being rotated synchronously with the pivot shaft;
wherein the pivot shaft is locked with the two adjacent linkage toothed plates through a lock nut; and
wherein an elastic member is sleeved on the pivot shaft, and the elastic member is located between the lock nut and one of the two adjacent linkage toothed plates.

9. The faucet of claim 8, wherein the two rows of linkage plate assemblies include a different amount of linkage toothed plates.

10. The faucet of claim 8, wherein the housing is a flexible housing.

* * * * *